United States Patent [19]

Hirata et al.

[11] Patent Number: 5,232,178
[45] Date of Patent: Aug. 3, 1993

[54] RETRACTOR WITH CLAMPING MECHANISM

[75] Inventors: Kazumi Hirata; Hiromichi Komori; Takanobu Sasaki, all of Kanagawa, Japan

[73] Assignee: NSK Ltd., Tokyo, Japan

[21] Appl. No.: 873,009

[22] Filed: Apr. 24, 1992

[30] Foreign Application Priority Data

Apr. 25, 1991 [JP] Japan .............................. 3-37764[U]

[51] Int. Cl.$^5$ ............................................ B65M 75/48
[52] U.S. Cl. .................... 242/101.4 R; 242/107.4 A; 242/101.4 B
[58] Field of Search .................... 242/107.2, 107.4 A, 242/107.4 B

[56] References Cited

U.S. PATENT DOCUMENTS

| | | | |
|---|---|---|---|
| 4,241,886 | 12/1980 | Naekawa et al. | 242/107.2 |
| 4,249,708 | 2/1981 | Asano | 242/107.2 |
| 4,437,623 | 3/1984 | Wyder | 242/107.2 |
| 4,687,253 | 8/1987 | Ernst et al. | 297/478 |
| 4,928,902 | 5/1990 | Tsuji | 242/107.2 |
| 5,029,769 | 7/1991 | Föhl | 242/107.4 B X |
| 5,127,598 | 7/1992 | Fujimura | 242/107.2 |
| 5,137,226 | 8/1992 | Fujimura et al. | 242/107.2 |
| 5,154,368 | 10/1992 | Fujimura et al. | 242/107.2 |

*Primary Examiner*—Daniel P. Stodola
*Assistant Examiner*—John P. Darling

*Attorney, Agent, or Firm*—Sughrue, Mion, Zinn, Macpeak & Seas

[57] ABSTRACT

A retractor including emergency locking mechanism including a ratchet plate mounted on a winding shaft onto and from which a webbing is wound and unwound, an inertia member which is turned in response to the rotation of the shaft, a latch member which is turned together with the shaft in a webbing pull-out direction so as to engage a pawl with the ratchet plate to lock the shaft to prevent it from being rotated in such a direction as to allow the webbing to be pulled out of the retractor, and a locking mechanism for coupling the latch member to the shaft when the turning of the inertia member lags behind that of the shaft; and a clamping mechanism for pinching the webbing between a swingable clamping engagement member and the inner surface of the base of the retractor so as to prevent the webbing from being pulled out of the retractor, wherein a control mechanism for either swinging the clamping engagement member in a webbing pinch direction so as to put the engagement member in a first position for preventing the webbing from being pulled out of the retractor, or putting the engagement member in a second position for allowing the webbing to be pulled out of the retractor includes a control plate turnable about the same axis as the ratchet plate and supporting the pawl in a swingable member, and a lever for putting the engagement member in the first or second position in response to the turning of the control plate.

9 Claims, 6 Drawing Sheets

RETRACTOR WITH CLAMPING MECHANISM

BACKGROUND OF THE INVENTION

The present invention relates to a retractor for a seat belt, and more particularly relates to a retractor having a clamping mechanism which directly pinches a webbing as a seat belt at the time of an emergency so as to clamp the webbing to minimize the pulled-out length thereof from the retractor.

A seat belt device for safely keeping an occupant on the seat of a vehicle or the like includes a webbing as a seat belt, a buckle, fasteners, and a retractor which automatically pulls the webbing into the retractor and winds the webbing when the device is not in use. The retractor functions so that the webbing is protected from damage and that the pulled-out length of the webbing from the retractor can be optionally altered when the seat belt device is in use.

Such retractors include an automatic-locking retractor, an emergency-locking retractor and the like. The emergency-locking retractor is generally used in order to avoid the problem of excessively restraining an occupant to give him a feeling of pressure. For that purpose, an emergency locking mechanism having an inertia sensor which reacts to a sharp acceleration, a collision, a sharp deceleration or the like to physically lock the winding shaft of the emergency-locking retractor to keep the shaft from rotating in such a direction as to allow a webbing as a seat belt to be pulled out of the retractor is provided therein to effectively and safely restrain the occupant and reduce his feeling of pressure of the webbing. Even when the seat belt device having the emergency-locking retractor is in use, the webbing remains wound by a relatively large length around the winding shaft of the retractor so as to be tightened on the webbing itself due to the tension thereof. For that reason, the webbing unwinds out of the retractor at the time of an emergency although the winding shaft is locked at that time not to rotate in such a direction as to allow the webbing to be pulled out of the retractor. This is a problem. Since such unwinding deteriorates the occupant restraining function of the retractor, the unwinding needs to be minimized.

Accordingly, various retractors each including a clamping mechanism which directly pinches a webbing at the outlet opening of the retractor to minimize the unwinding of the webbing have been proposed. For such a clamping mechanism, there is a manner of pinching a webbing between a guide roller on which the webbing is wound to be guided by the roller, and a clamping member secured to a base. However, the manner has a drawback that since it is complicated to lay the webbing around in the retractor, it does not feel good to either pull the webbing into the retractor to wind the webbing therein, or pull it out of the retractor to unwind the webbing therein.

SUMMARY OF THE INVENTION

The present invention was made in order to eliminate the above-mentioned drawback. Accordingly, it is an object of the invention to provide a retractor which includes an emergency locking mechanism for locking a winding shaft for a webbing at the time of an emergency such as a collision so as to prevent the shaft from being rotated in such a direction as to allow the webbing to be pulled out of the retractor, and a clamping mechanism simple in constitution and sure to properly operate, and is such that it feels good to pull the webbing into the retractor to wind the webbing, and pull it out of the retractor to unwind the webbing.

The retractor according to the present invention includes an emergency locking mechanism for locking a winding shaft at the time of an emergency and a clamping mechanism for preventing a webbing from being pulled out of the retractor, wherein the retractor comprising: a base; a ratchet plate mounted on the shaft which is for winding the webbing; an inertia member which is turned in response to the rotation of the shaft; a pawl which can be engaged with the ratchet plate, and be put either in a first position for locking the shaft to prevent it from being rotated in such a direction as to allow the webbing to be pulled out of the retractor, or in a second position for unlocking the shaft to allow it to be rotated in the direction; a latch member which can be turned together with the shaft in the direction so as to engage the pawl with the ratchet plate to lock the shaft to prevent it from being rotated in the direction; a locking means for coupling the latch member to the shaft when the rotation of the inertia member lags behind that of the shaft; a swingable clamping engagement member; inner surface provided on the base so that the webbing can be pinched and clamped between the surface and the clamping engagement member; and a control means for either swinging the engagement member in a webbing pinch direction so as to put the engagement member in a first position for preventing the webbing from being pulled out of the retractor, or putting the engagement member in a second position for allowing the webbing to be pulled out of the retractor, the control means including a control plate turnable about the same axis as the ratchet plate and supporting the pawl in a swingable manner, and a lever which is swung in response to the turning of the control plate so as to put the engagement member in the first or second position.

Although the control means is only added to the emergency locking mechanism, the clamping mechanism can be operated through the operation of the former mechanism which is operated through the action of a conventional inertia sensor. For that reason, the constitution of the retractor is simple, and it feels good to pull the webbing into the retractor to wind the webbing, and pull it out of the retractor to unwind the webbing. Besides, the clamping mechanism is simple in constitution, and sure to properly operate.

DETAILED DESCRIPTION OF EXEMPLARY EMBODIMENTS

Embodiments of the present invention are hereafter described in detail with reference to the drawings attached hereto.

FIGS. 1, 2, 3, 4, 5 and 6 show a retractor which is one of the embodiments and is for a webbing 47 as the seat belt of a vehicle. The retractor includes a base 1, a winding reel 2, a winding shaft 4, a lower cover 5, a retainer 6, upper cover 7, a winding spring 8, an emergency locking mechanism, and a clamping mechanism.

Figure 1:
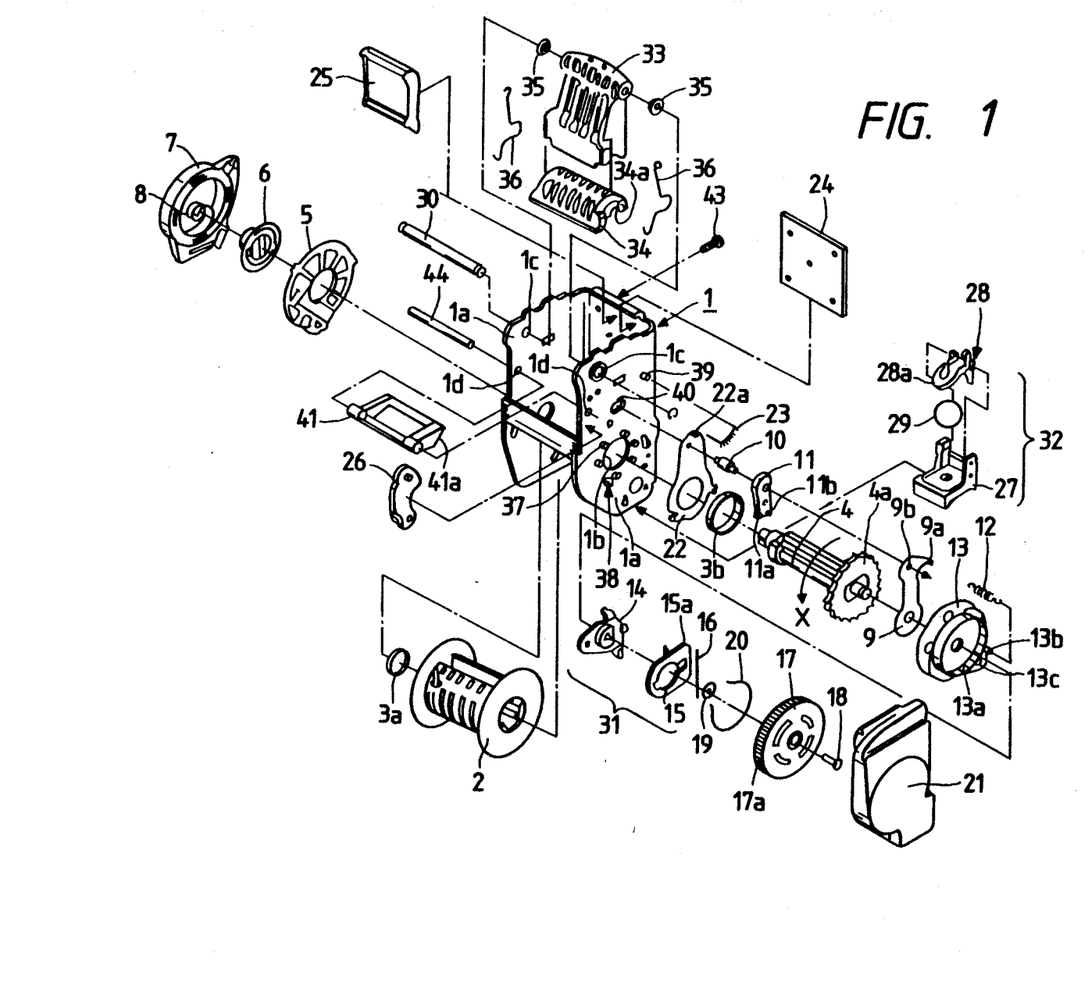
FIG. 1 is a perspective exploded view of a retractor which includes a clamping mechanism and is an embodiment of the present invention.

The base 1 has a cross section generally shaped as U, and includes two side plate la having through holes 1b opposed to each other. The winding shaft 4 is secured to the winding reel 2 onto and from which the webbing 47 is wound and unwound. The winding shaft 4 is fitted with plastic bushings 3a and 3b in the through holes 1b of the base 1 so that the shaft is rotatably supported. The retainer 6 is provided on the winding shaft 4 at one end thereof. The winding spring 8 is engaged at the inner end thereof with the retainer 6, and engaged at the outer end of the spring with the inner surface of the cover 7 secured to the side plate la of the base 1, and always urges the winding shaft 4 to rotate it in such a direction as to wind the webbing 47 onto the reel 2.

The emergency locking mechanism for preventing the webbing 47 from being pulled out of the retractor at the time of an emergency so as to be unwound from the winding reel 2 is provided at the other end of the winding shaft 4. The mechanism includes a ratchet plate 4a, an upper tension plate 9, a pawl pin 10, a pawl 11, a return spring 12, a latch cup 13, a flange 14, a locking member 15, a sensor spring 16, an inertia member (ratchet wheel) 17, a screw 18, a flat washer 19, a friction spring 20, and a vehicle body acceleration sensor 32. The ratchet plate 4a is a latch secured to the winding shaft 4 at the latter end thereof, which projects from the plate. The upper tension plate 9 and the latch cup 13 are movably fitted to the winding shaft 4 at the end thereof outside the ratchet plate 4a. The latch cup 13 has internal teeth 13a. The flange 14 is secured to the portion of the winding shaft 4, which is located outside the cup 13. The locking member 15 has a locking portion 15a capable of being engaged with the internal teeth 13a of the cup 13. The flange 14, the locking member 15 and the sensor spring 16 constitute the locking means 31 of the mechanism. The inertia member 17 is an inertia member provided outside the locking member 15 and movably fitted to the screw 18 engaged in the flange 14 and extending through the flat washer 19. The inertia member 17 has a plurality of teeth 17a formed on the outer circumferential surface or the inertia member and oriented in such a direction as to allow the webbing 47 to be pulled out of the retractor as the tooth is engaged with the sensor arm 28 of the vehicle body acceleration sensor 32. The inertia member 17 is coupled to the locking member 15 by the friction spring 20 so that the inertia member can be either rotated together with the winding shaft 4 or displaced relative thereto.

Figure 2:
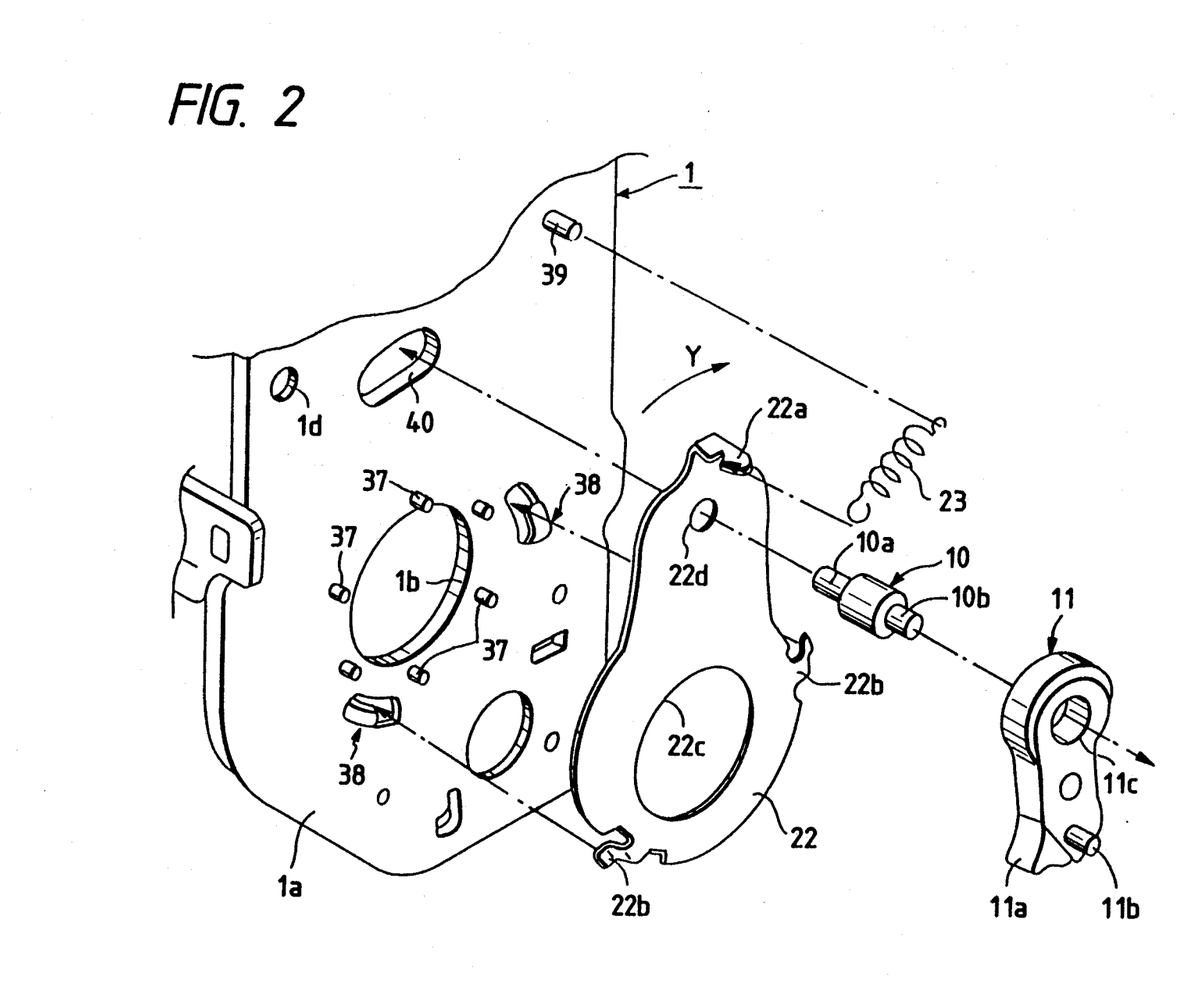
FIG. 2 is a perspective enlarged view of a major part of the retractor.
Figures 3, 6:
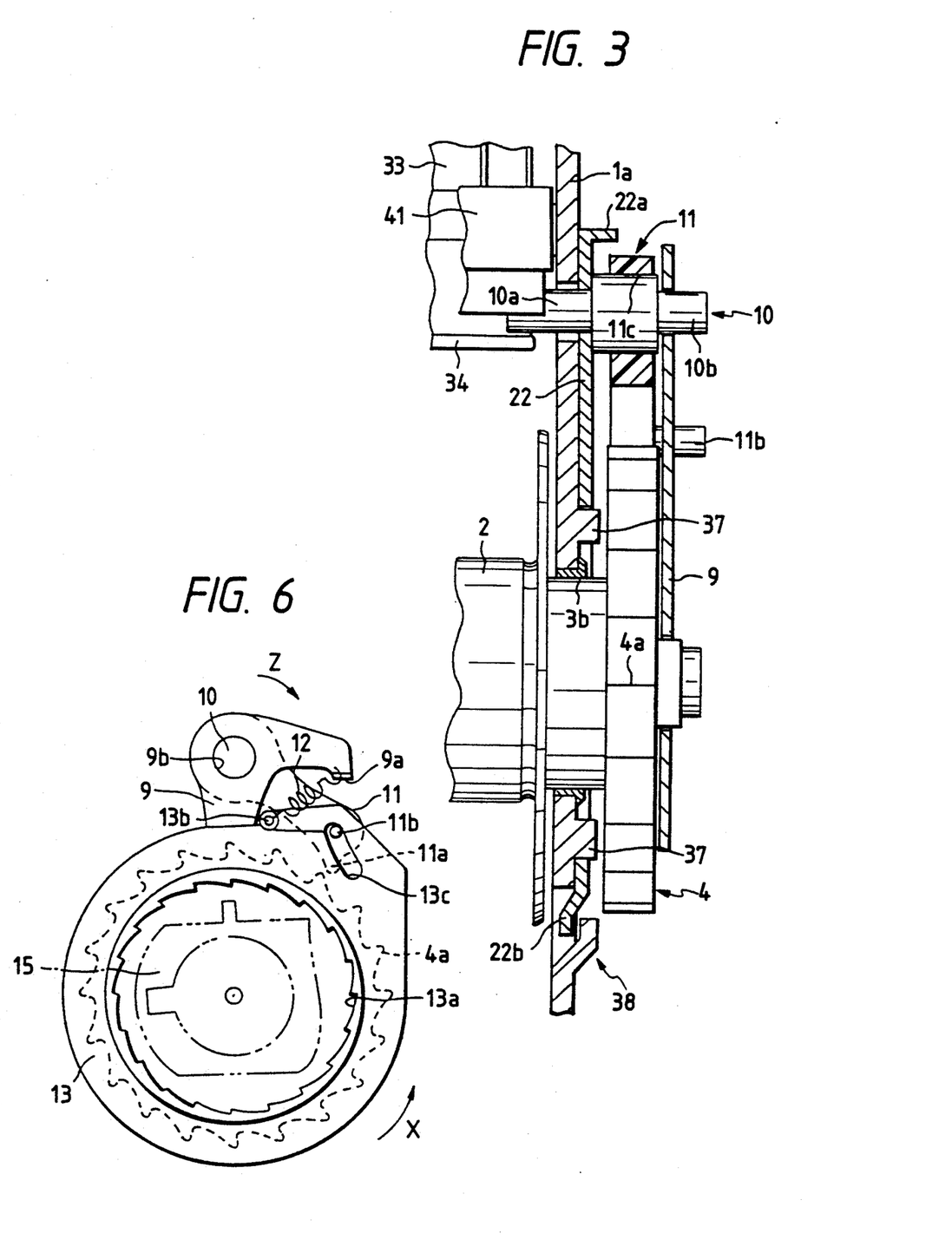
FIG. 3 is an enlarged sectional view of a major part of the retractor.
FIG. 6 is an enlarged view of a major part of the retractor to illustrate the operation of the emergency locking mechanism thereof.

The vehicle body acceleration sensor 32 includes a sensor case 27 secured to the side plate la, a weight ball 29 which is a sensing member disposed in the interior opening of the case, the sensor arm 28 having a jut 28a and attached to the case so as to be swingable, and a sensor cover 21 provided outside the side plate and covering the emergency locking mechanism. Lower tension plate 22 is provided between the side plate la and the ratchet plate 4a so that the tension plate can be turned about the same axis as the ratchet plate. As shown in FIGS. 2 and 3, the tension plate 22 is rotatably supported at the edge thereof along the opening 22c of the plate by projections 37 formed at equal intervals on the side plate la around the through hole 1b thereof, and has claws 22b formed at the peripheral edge of the tension plate and engaged with the engagement portions 38 of the side plate around the projections so that the tension plate is kept from moving in the axial direction of the winding shaft 4.

The pawl 11, which is engaged with the ratchet plate 4a to prevent it from being turned in such a direction X as to allow the webbing 47 to be pulled out of the retractor, is pivotally coupled with the pawl pin 10 to the tension plate 22 so that the pawl can be either engaged with the ratchet plate or disengaged therefrom. The inner portion 10a of the pawl pin 10 extends through the through hole 22d of the free end portion of the tension plate 22 and the slender hole 40 of the side plate la, and projects into the base 1. The outer portion 10b of the pin 10 is fitted in the through hole 9a of the free end portion of the other tension plate 9. The pawl 11 has a pawl guide jut 11b put in the pawl guide hole 13c of the projecting portion of the latch cup 13. A return spring 23 is engaged at one end thereof with an engagement projection 39 formed on the peripheral portion of the side plate la, and is engaged at the other end of the spring with the spring engagement portion 22a of the tension plate 22, so that the spring urges the tension plate in a direction Y shown in FIG. 2.

The clamping mechanism is provided in the base 1 in order to directly pinch the webbing 47 to prevent it from being pulled out of the retractor. The mechanism includes a clamping engagement member 34 having a semicylindrical form and clamping teeth 34b formed on the flat surface of the member and capable of being engaged on the webbing 47 to clamp it to prevent the webbing from being pulled out of the retractor, a clamping engagement member holder 33 supporting the member in a swingable manner, a webbing guide 25 for guiding the webbing along the inner surface of the base 1, a clamping shaft 30, plastic bushings 35, return springs 36, and a clamping lever 41. The holder 33 is rotatably supported by the clamping shaft 30 fitted with the plastic bushings 35 in the through holes 1c of the side plates la of the base 1. The clamping engagement member 34 is disposed in the semicylindrical recess of the swinging end portion of the holder 33 so that the clamping teeth 34b of the member can be always uniformly and tightly engaged on the surface of the webbing 47 when it is directly pinched by the clamping mechanism. The return springs 36 are engaged with engagement projections 34a formed on the clamping engagement member 34 at both the ends of the length thereof, and urge the member in such a direction as not to engage it with the webbing 3. The webbing guide 35 and reinforcing plate 24 provided between the guide and the inner surface of the base 1 to reinforce it are secured to each other by screws 43.

The clamping lever 41 is provided on the clamping engagement member holder 33 so that the lever can prevent the holder from being swung by the urging forces of the return springs 36. The lever 41 is supported in a swingable manner with a pin 44 extending through the through holes 1d of the side plates la, and has an oblique engagement downside portion 41a near the swinging end of the lever so that the portion is engaged with the inner portion 10a of the pawl pin 10 to make it possible to prevent the downward swing of the lever to keep the holder 33 from being swung by the urging forces of the return springs 36. When the pawl pin 10 is moved forward, the inner portion 10a thereof pushes up the oblique engagement downside portion 41a of the clamping lever 41 so that the lever is swung upward to push the holder 33 against the urging forces of the return springs 36 to move the clamping engagement member 34 in such a direction as to engage it on the webbing 47 to pinch and clamp it in check.

Figure 4:
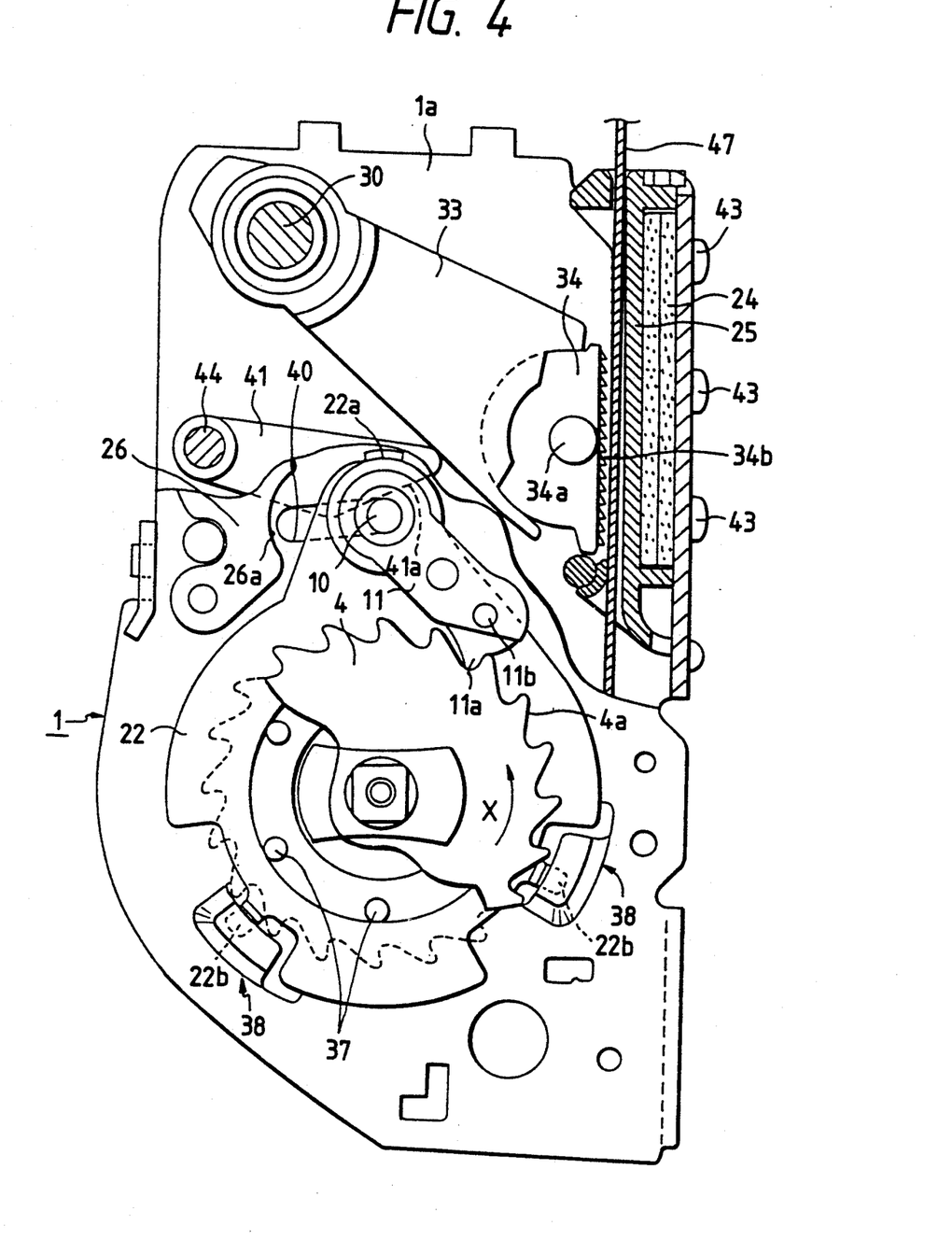
FIG. 4 is a cutaway side view of the retractor to illustrate the operation of the clamping mechanism.

The operation of the retractor is described from now on. When the seat belt is in a normal state of use, the inner portion 10a of the pawl pin 10 extending through the through hole 22d of the tension plate 22 is located in the slender hole 40 at the rear end thereof (at its right-hand end with regard to FIG. 4) due to the urging force of the return spring 23, and the clamping engagement member 34 is urged by the other return springs 36 in such a direction that the member is not engaged with the webbing 47, as shown in FIG. 4. At the same time, the return spring 12 engaged with the spring engagement jut 13b of the latch cup 13 and 9a of the tension plate 9 urges the cup in a direction reverse to that X, and the pawl 11 having the pawl guide jut 11b fitted in the pawl guide hole 13c of the cup is urged in such a direction as not to be engaged with the ratchet plate 4a, as shown in FIG. 6. As a result, the webbing 47 can be optionally pulled out of the retractor.

Figure 5:
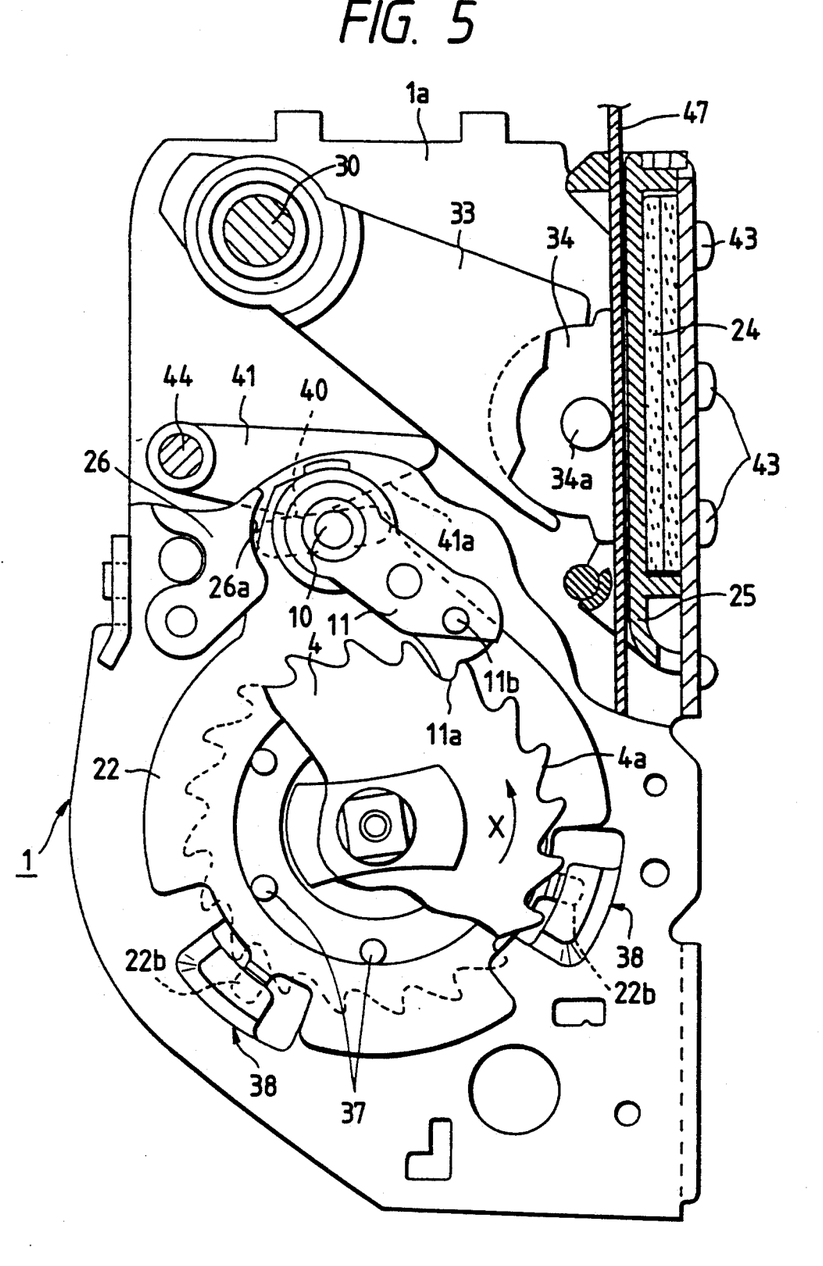
FIG. 5 is a cutaway side view of the retractor to illustrate the operation of the mechanism.

When the webbing 47 receives a tensile force at the time of an emergency such as the collision of the vehicle so that impulsive torque larger than a prescribed magnitude acts to the winding shaft 4 in such a direction X as to pull the webbing out of the retractor, the inertia member 17 receives an inertial force so that the inertia member is turned relative to the winding shaft in a direction reverse to that of the webbing pull-out rotation of the shaft. As a result, the locking means 31 operates so that the engagement portion 15a of the locking member 15 is engaged with the internal tooth 13a of the latch cup 13 to transmit the turning force of the flange 14 to the cup to turn it in the direction X against the urging force of the return spring 12. At that time, the pawl 11 having the pawl guide jut 11b fitted in the pawl guide hole 13c of the latch cup 13 is swung in a direction Z so that the engagement portion 11a of the pawl is engaged with the ratchet plate 4a. When the winding shaft 4 is then turned further in the direction X as the engagement portion 11a remains engaged with the ratchet plate 4a, the tension plate 22 pivotally coupled with the pawl 11 is also turned in the direction X, as shown in FIG. 5. At that time, the inner portion 10a of the pawl pin 10 is moved in the slender hole 40 forward (leftward with regard to FIG. 5) from the rear end thereof so that the swinging end of the clamping lever 41 is swung upward by the oblique engagement downside portion 41a engaged with the inner portion of the pin to cause the clamping engagement member holder 33 to swing the clamping engagement member 34, against the urging force of the return spring 23, in such a direction as to pinch and clamp the webbing 3. Therefore, the webbing 47 is pinched and clamped between the clamping engagement member 34 and the webbing guide 25 so that the webbing is prevented from being pulled out of the retractor. At the same time, the holder 33 becomes incapable of being turned further and prevents the clamping lever 41 from being swung further. For that reason, the inner portion 10a of the pin 10 is held in check by the oblique engagement downside portion 41a so that the tension plate 22 is prevented from being turned in the direction X. As a result, the pawl 11 pivotally coupled with the tension plate 22 and having the engagement portion 11a engaged with the ratchet plate 4a keeps the winding shaft 4 from being turned in the direction X. If some cause hinders the clamping mechanism from properly operating and the inner portion 10a of the pawl pin 10 consequently fails to be held in check by the oblique engagement downside portion 41a, the engagement portion of a pawl stopper 26 secured to the side plate 1a near the front edge thereof prevents the pawl 11 from being swung in the direction X. The emergency locking mechanism is thus made sure to prevent the winding shaft 4 from being turned.

When the speed of the vehicle undergoes a change larger than a prescribed value, at the time of an emergency, the weight ball 29 rotates to swing the sensor arm 28 to engage the tip thereof with the tooth 17a of the inertia member 17 to prevent the inertia member from being turned in such a direction as to allow the webbing 47 to be pulled out of the retractor. If the webbing 47 is pulled out of the retractor further as the inertia member 17 remains thus prevented from being turned in that direction, the inertia member is rotated relative to the winding shaft 4 in a direction reverse to the former. As a result, the locking means 31 is put into action so that the clamping mechanism and the emergency locking mechanism operate in the above-described manner to prevent the webbing 47 from being pulled out of the retractor any more.

When the tensile force acting to the webbing 47 has vanished, the engagement portion 15a of the locking member 15 and the tooth 13a of the latch cup 13 are disengaged from each other and the urging force of the return spring 12 turns the cup in the direction reverse to that X, so that the pawl 11 is swung in a direction reverse to that Z, and the engagement portion 11a of the pawl and the ratchet plate 4a are disengaged from each other to unlock the plate. At that time, the tension plate 22 is turned back to a prescribed position in the direction Y by the urging force of the return spring 23 so that the urging of the clamping lever 41 is ceased. As a result, the return springs 36 urge the clamping engagement member 34 in such a direction as not to engage it with the webbing 3, so that the webbing can be optionally pulled out of the retractor.

The clamping mechanism can thus be operated through the operation of the emergency locking mechanism which is operated through the operation of the vehicle body acceleration sensor 32 which is a conventional inertia sensor. Since a control means including the tension plate 22 as a control plate and the clamping lever 41, which is swung in response to the turning of the tension plate so as to put the clamping engagement member 34 into a webbing pinch position or a webbing non-pinch position, is only added to the emergency locking mechanism, the constitution of the retractor is relatively simple. Since the retractor does not include a guide roller on which the webbing is wound to be guided by the roller, it feels good to pull the webbing into the retractor to wind the webbing onto the winding reel, and pull the webbing out of the retractor to unwind the webbing from the reel.

Figure 7:
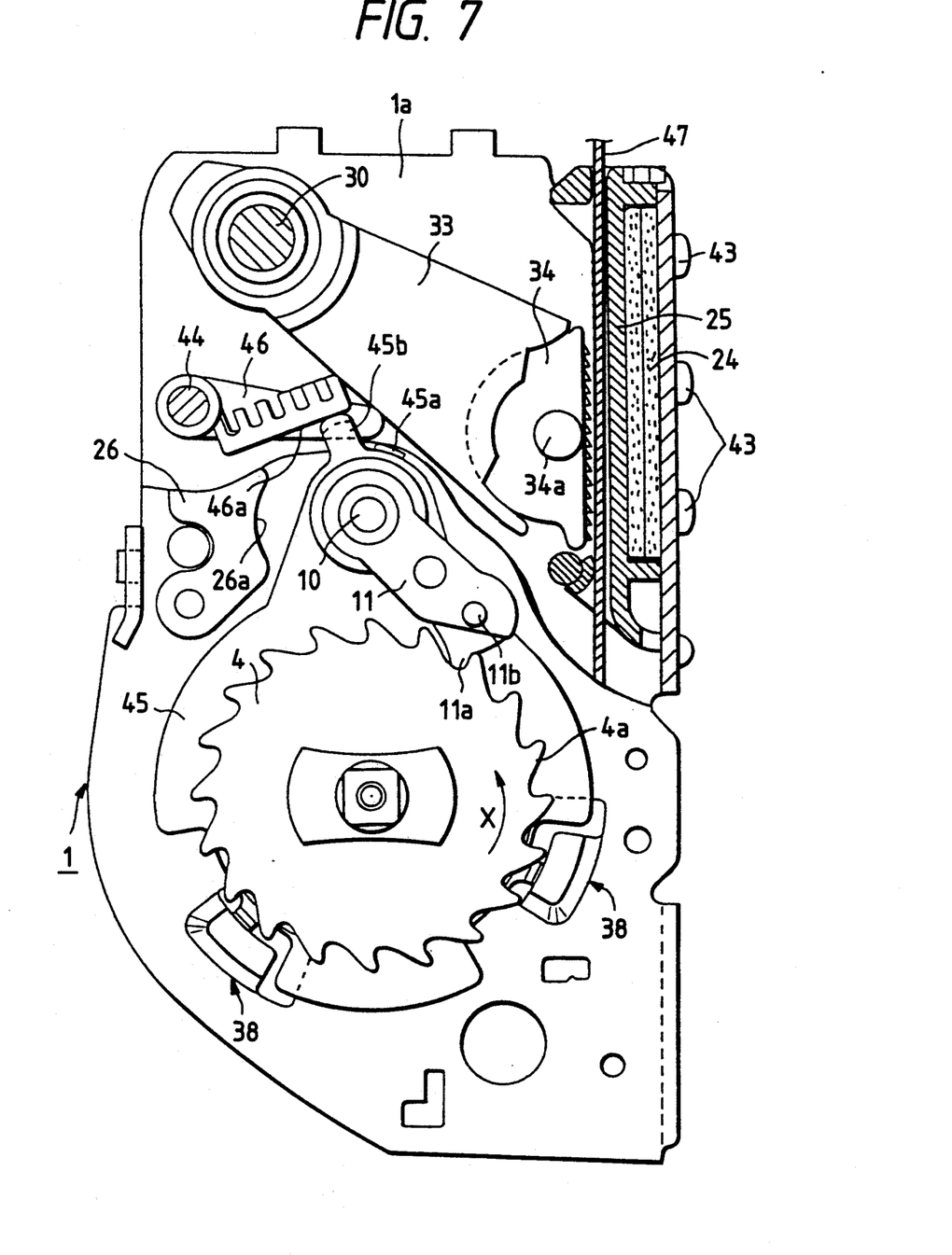
FIG. 7 is a cutaway side view of a retractor which includes a clamping mechanism and is another embodiment of the present invention.

The present invention is not confined to the above-described embodiment, but may be embodied or practiced in other various ways without departing from the scope or spirit of the invention. For example, the invention may be embodied as a retractor including a tension plate 45 and a clamping lever 46 which differ in form from the preceding ones 22 and 41. The tension plate 45 has a spring engagement jut 45a and a projecting part 45b at the peripheral edge of the swinging end portion of the plate. The clamping lever 46 has an oblique engagement surface 46a engaged with the tip of the projecting part 45b of the tension plate 45 in order to swing the lever by the plate. In this embodiment, a pawl pin 10 does not need to extend through the tension plate 45, but is secured thereto and pivotally coupled with a pawl 11 and extends through lower tension plate 22. In other respects, the embodiment is the same as the preceding one. The present invention may also be embodied as a seat belt retractor including an emergency locking mechanism different in constitution from that of the above-described retractor, or be embodied as a seat belt retractor including an emergency locking mechanism having an automatic locking function.

In the present invention, since a control plate and a control means including a clamping lever which is swung in response to the turning of the control plate so as to put the clamping engagement member into a webbing pinch position or a webbing non-pinch position and so on are only added to an emergency locking mechanism for a webbing at the time of an emergency such as a collision so as to prevent the shaft from being rotated in such a direction as to allow the webbing to be pulled out of the retractor, the clamping mechanism can be operated through the operation of the emergency locking mechanism which is operated through the operation of a conventional inertia sensor. Therefore, the constitution of the retractor can be relatively simple, and further it feels good to pull the webbing into the retractor to wind the webbing onto the winding reel, and pull the webbing out of the retractor to unwind the webbing from the reel.

Accordingly, it is possible to provide a retractor with a clamping mechanism which includes an emergency locking mechanism for locking a winding shaft in which a clamping mechanism thereof is simple in constitution and is sure to properly operate.

What is claimed is;

1. A retractor, including an emergency locking mechanism for locking a winding shaft, upon which a webbing is wound, at the time of an emergency and a clamping mechanism for preventing said webbing from being pulled out of said retractor, said retractor comprising:
   a base, ends of said winding shaft being supported in through holes formed in said base;
   a ratchet plate mounted on said winding shaft;
   an inertia member coupled to said winding shaft so as to be turned in response to rotation of said winding shaft;
   a pawl which can be engaged with said rachet plate, and is movably mounted on said base so as to be put ether in a first position for locking said winding shaft to prevent it from being rotated in a first direction and thus prevent said webbing from being pulled out of said retractor, or in a second position for unlocking said winding shaft to allow it to be rotated in said first direction;
   a latch member which can be turned together with said winding shaft in said first direction so as to engage said pawl with said ratchet plate to lock said winding shaft and prevent it from being rotated in said first direction;
   locking means for coupling said latch member to said shaft when the rotation of said inertia member lags behind that of said shaft;
   a swingable clamping engagement member, an inner surface of said base being positioned in opposition to said clamping engagement member so that said webbing can be pinched and clamped between said inner surface and said clamping engagement member; and
   control means for either swinging said engagement member in a webbing pinch direction so as to put said engagement member in a third position for preventing said webbing from being pulled out of said retractor, or putting said engagement member in a fourth position for allowing said webbing to be pulled out of said retractor, said control means including a control plate turnable about the same axis as said ratchet plate and supporting said pawl in a swingable manner and a lever engaged with said control plate so as to be swung in response to the turning of said control plate so as to put said engagement member in said third or fourth position, said control plate being rotatably supported by projections provided on said base, said projections being disposed around said through hole.

2. A retractor according to the claim 1, wherein the base is fitted with a pawl stopper for hindering the pawl from being swung to be engaged with the ratchet plate to lock the winding shaft to prevent it from being rotated in the direction for allowing the webbing to be pulled out of said retractor.

3. A retractor according to the claim 1, wherein said pawl is pivotally coupled with a pawl pin.

4. A retractor according to said claim 3, wherein said lever has an oblique engagement portion which is engaged with the pawl pin.

5. A retractor, including an emergency locking mechanism for locking a winding shaft, upon which a webbing is wound, at the time of an emergency and a clamping mechanism for preventing said webbing from being pulled out of said retractor, said retractor comprising:
   a base, supporting said winding shaft;
   a ratchet plate mounted on said winding shaft;
   an inertia member coupled to said winding shaft so as to be turned in response to rotation of said winding shaft;
   a pawl which can be engaged with said rachet plate, and is movably mounted on said base so as to be put either in a first position for locking said winding shaft to prevent it from being rotated in a first direction and thus prevent said webbing from being pulled out of said retractor, or in a second position for unlocking said winding shaft to allow it to be rotated in said first direction;
   a latch member which can be turned together with said winding shaft in said first direction so as to engage said pawl with said ratchet plate to lock said winding shaft and prevent it from being rotated in said first direction;
   locking means for coupling said latch member to said shaft when the rotation of said inertia member lags behind that of said shaft;
   a swingable clamping engagement member, an inner surface of said base being positioned in opposition to said clamping engagement member so that said webbing can be pinched and clamped between said inner surface and said clamping engagement member; and control means for either swinging said engagement member in a webbing pinch direction so as to put said engagement member in a third position for preventing said webbing from being pulled out of said retractor, or putting said engagement member in a fourth position for allowing said webbing to be pulled out of said retractor, said control means including a control plate turnable about the same axis as said ratchet plate and supporting said pawl in a swingable manner, and a lever engaged with said control plate so as to be swung in response to the turning of said control plate so as to put said engagement member in said third or fourth position, said lever having an oblique engagement portion which is engaged with said control plate.

6. A retractor according to claim 5, wherein said base is fitted with a pawl stopper which is engageable with said pawl so as to prevent said pawl from being swung into said second position.

7. A retractor according to claim 5, wherein said control plate is rotatably supported by projections provided on the base, said projections being disposed around said through hole.

8. A retractor according to claim 5, wherein said pawl is pivotally coupled with a pawl pin.

9. A retractor according to claim 8, wherein said lever has an oblique engagement portion which is engaged with said pawl pin.

* * * * *